July 6, 1926.                J. ROLLAND                1,591,105
                              TOW LINE
                          Filed Feb. 13, 1925
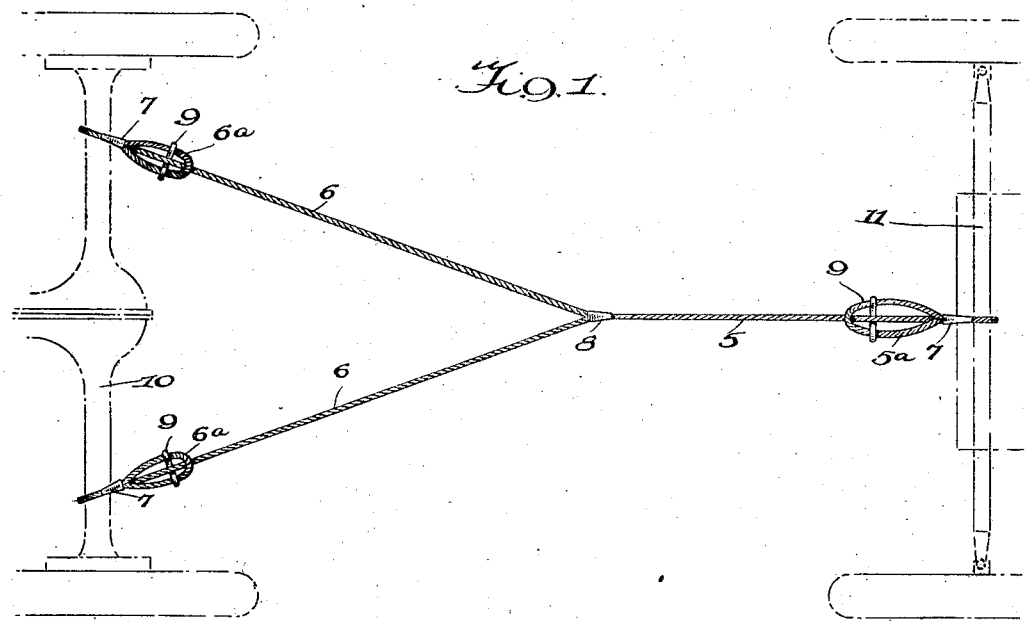
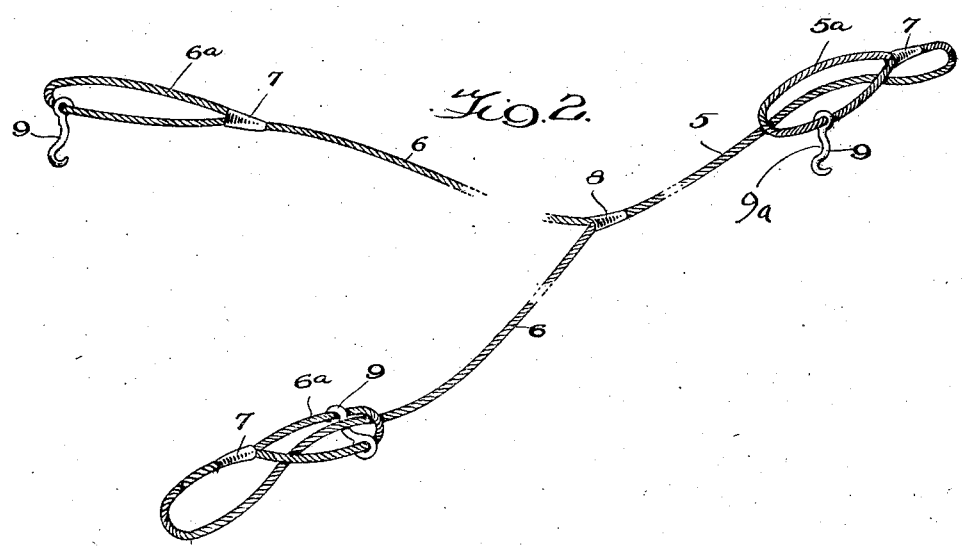
Inventor
JACOB ROLLAND,
By Stevens and Batchelor
Attorneys Patented July 6, 1926.

UNITED STATES PATENT OFFICE.

JACOB ROLLAND, OF CARNEGIE, PENNSYLVANIA.

TOWLINE.

Application filed February 13, 1925. Serial No. 8,958.

My invention relates to tow lines, and especially to such as are adapted for use in towing one motor vehicle by means of another.

The prior art discloses tow lines including various means for attachment to the axles of the towing and towed vehicles. These connecting means frequently include arrangements whereby the axles may be included in a loop formed at the ends of the line. Such arrangements usually involve a loop including separably connected portions which are designed to be separated to permit placing of the loop around an axle. Such arrangement necessarily requires a fastening means for holding the loop closed. Other tow line arrangements of the prior art involve an axle engaging portion which is separable from the main part of the line. The presence of various accessory elements increases the cost of a line, and in addition, naturally increases the number of places likely to become worn and thus detract from the efficiency of the device.

The principal object of my invention is to provide a tow line having means at the ends thereof whereby the line may be passed around the axle of a vehicle and formed in a slip knot, the means whereby such knot is formed being permanently carried by said loops which are closed at all times, a line characterized by my invention having no separable elements to become lost or worn which tend to lessen the efficiency of a device of this character. Another important object of the invention is to provide a novel splice holding and wear protecting device for the loops and a means whereby they will always bear against the body to which the line is attached.

The above and other features of novelty which characterize my invention are pointed out with particularity in the claims annexed to and forming a part of this specification. However, for a better understanding of the invention and its advantages, reference should be had to the accompanying drawings which illustrate what I now regard as a preferred embodiment of my inventive idea.

Like reference characters have been used in both views to indicate similar parts.

In the drawings:

Figure 1 is a plan view illustrating the application of the invention.

Figure 2 is a perspective view of the line attached.

Referring specifically to the drawings, the line is denoted generally by the numeral 5 and is provided with two branches 6 at one end, such branches and the opposite end of said line being provided with loops $6^a$ and $5^a$, respectively. The branches 6 may be produced by splicing or otherwise connecting a length of cable to the line 5 intermediate its ends, and in order to render more positive such connection, and to protect the same against wear, a tubular member 8 is passed along the line and crimped tightly into the spliced portion, the final form being substantially conical as clearly shown in the drawing. Similar conically crimped members 7 similar to the member 8 are used for retaining the loose ends of the loops $5^a$ and $6^a$, it being understood that such ends are spliced into the line in the same manner as above described. Each loop slidably carries a cross member 9, as clearly indicated in Figure 2, pivotal connection being had by means of an eye $9^b$ at one end. The other end is provided with a hook $9^c$.

In applying the invention the branches 6 are passed around the rear axle 10 of the towing vehicle and each loop is positioned against the branch rearwardly of the axle. Its hook $9^c$ is then swung transversely across the loop and engaged with the opposite side thereof beneath the part of the branch immediately beneath. A slip knot-like hitch is thus produced. This having been done, it will be obvious that pulling of the line will result in the tightening of the hitches upon the axle. It is to be noted particularly from Figure 2 that the cross members 9 are bowed inwardly intermediate their ends, as indicated at $9^a$, it being observed that these portions are adapted to engage the branches and form what might be termed a guide for the loops $6^a$ in their movement in the direction of the axle 10 when the line is being drawn taut. This is a very advantageous feature, for the reason that if the line forming the branches 6 should become jammed at one side of the loop, it would be likely to result in disengagement of the hook and would result in the unequal tightening of the slip hitches of the branches.

Application of the loop $5^a$ to the front axle of the vehicle to be towed is made in the manner identical to that just previously described.

The tow line having been applied as just described can only be disconnected by creating a slack in the line so as to relieve the pressure from the cross members 9 so that they may be disengaged. I preferably form the line with the branches 6 for connection to the towing vehicle so as to equalize the strain at each side of the differential housing. No branches are employed for attachment to the towed vehicle for the reason that in making a sharp turn the branches would be likely to engage with the front wheels. Of course a single line having looped ends could be used but I prefer a line having branches at one end as illustrated.

It will be understood from the drawings that the conically crimped splice protecting members 7 bear against the vehicle axles when the line is in use to prevent chafing and consequent weakening of the splice. These members 7 are maintained in engagement with the axles by reason of their conicity, the outwardly flaring walls resisting further rearward sliding movement of the loop on the branch strand. The bowed guide part 9ª of the hook, while it facilitates the application of the device and prevents subsequent disengagement of the hook or jamming, does reduce the friction of the main strand 5 or branch 6 upon cross member 9 and against the end of the loop. Therefore, without the conically crimped members 7 the loop would slide partially around the axle and member 9 would be likely to become bent or broken and in any event the hitch would be most difficult to unfasten. It is therefore, seen that by the structure recited the position of the loop and hitch is effectually maintained at all times; the loop splices are protected against wear; and the loop splice protecting means (conically crimped members 7) supplies sufficient functional restraint so that the cross member 9 can be provided with the guide recess 9ª for the purpose specified without such a loss of friction as to detract from the efficiency of the line.

Having thus described my invention what is claimed:—

1. The combination with a tow line or the like having its end reverted and connected to the main strand to define a loop; of a protective casing for said connection, means for connecting said loop to the main strand to form a slip hitch attachment to a vehicle axle or the like, said casing engaging the axle when the line is in use and frictionally restraining said loop and main strand connecting means from wrapping around said axle.

2. The combination with a tow line or the like having its end reverted and connected to the main strand to define a loop; of a protective casing for said connection, a rigid cross member having an eye at one end and a hook at the other for connecting said loop to the main strand to form a slip hitch attachment to a vehicle axle or the like, said cross member having a medial open guide and friction reducing recess for said main strand, said casing engaging the axle when the line is in use and frictionally restraining said loop and cross member from wrapping around said axle.

3. The combination with a tow line or the like having its end reverted and connected to the main strand to define a loop; of a conical protective casing crimped about said connection with its flared end extending in the direction of said loop, means for connecting said loop to the main strand to form a slip hitch attachment to a vehicle axle or the like, said casing engaging the axle when the line is in use and frictionally restraining said loop and main strand connecting means from wrapping around said axle.

4. The combination with a tow line or the like having its end reverted and connected to the main strand to define a loop; of a conical protective casing crimped about said connection with its flared end extending in the direction of said loop, a rigid cross member having an eye at one end and a hook at the other for connecting said loop to the main strand to form a slip hitch attachment to a vehicle axle or the like, said cross member having a medial open guide and friction reducing recess for said main strand, said casing engaging the axle when the line is in use and frictionally restraining said loop and cross member from wrapping around said axle.

In testimony whereof I affix my signature.

JACOB ROLLAND,